United States Patent [19]

Churchill

[11] 4,031,322
[45] June 21, 1977

[54] TELEPHONE OPERATED SIGNALLING SYSTEM

[75] Inventor: Steven T. Churchill, Wilton, Conn.

[73] Assignee: Letot, Incorporated, Fairfield, Conn.

[22] Filed: Sept. 30, 1975

[21] Appl. No.: 618,148

[52] U.S. Cl. .............................................. 179/2 A
[51] Int. Cl.² ...................................... H04M 11/02
[58] Field of Search ................. 179/2 R, 2 A, 81 C, 179/84 C, 84 L; 340/286 R

[56] References Cited

UNITED STATES PATENTS

| | | | |
|---|---|---|---|
| 3,614,325 | 10/1971 | Galian | 179/2 R |
| 3,636,280 | 1/1972 | Wetzel | 179/175.3 |
| 3,742,141 | 6/1973 | Duncan | 179/2 A |
| 3,777,065 | 12/1973 | Galian | 179/2 R |
| 3,854,009 | 12/1974 | Pirnie | 179/2 A |
| 3,892,922 | 7/1975 | Stankus | 179/2 A |

*Primary Examiner*—Kathleen H. Claffy
*Assistant Examiner*—Joseph A. Popek
*Attorney, Agent, or Firm*—Pennie & Edmonds

[57] ABSTRACT

A telephone operated signalling system for use with a telephone having a manually operated switch and which is connected to a telephone substation where the system has room status indicating means responsive to operation of the manually operated switch, and means for disconnecting the telephone from the substation and connecting it to the signalling system. Indicator switch means are positioned between power means energizing the indicating means whereby the indicating means may be deenergized during long periods of time that the telephone is connected to the signalling system. A circuit is connected to the substation when the telephone is disconnected therefrom to provide means for preventing any malfunction signal caused by any test scanning current applied to the substation to indicate that the telephone is disconnected from the substation. Holding means are provided for holding the indicating means in a set position regardless of any power interruption in the signalling system.

3 Claims, 1 Drawing Figure

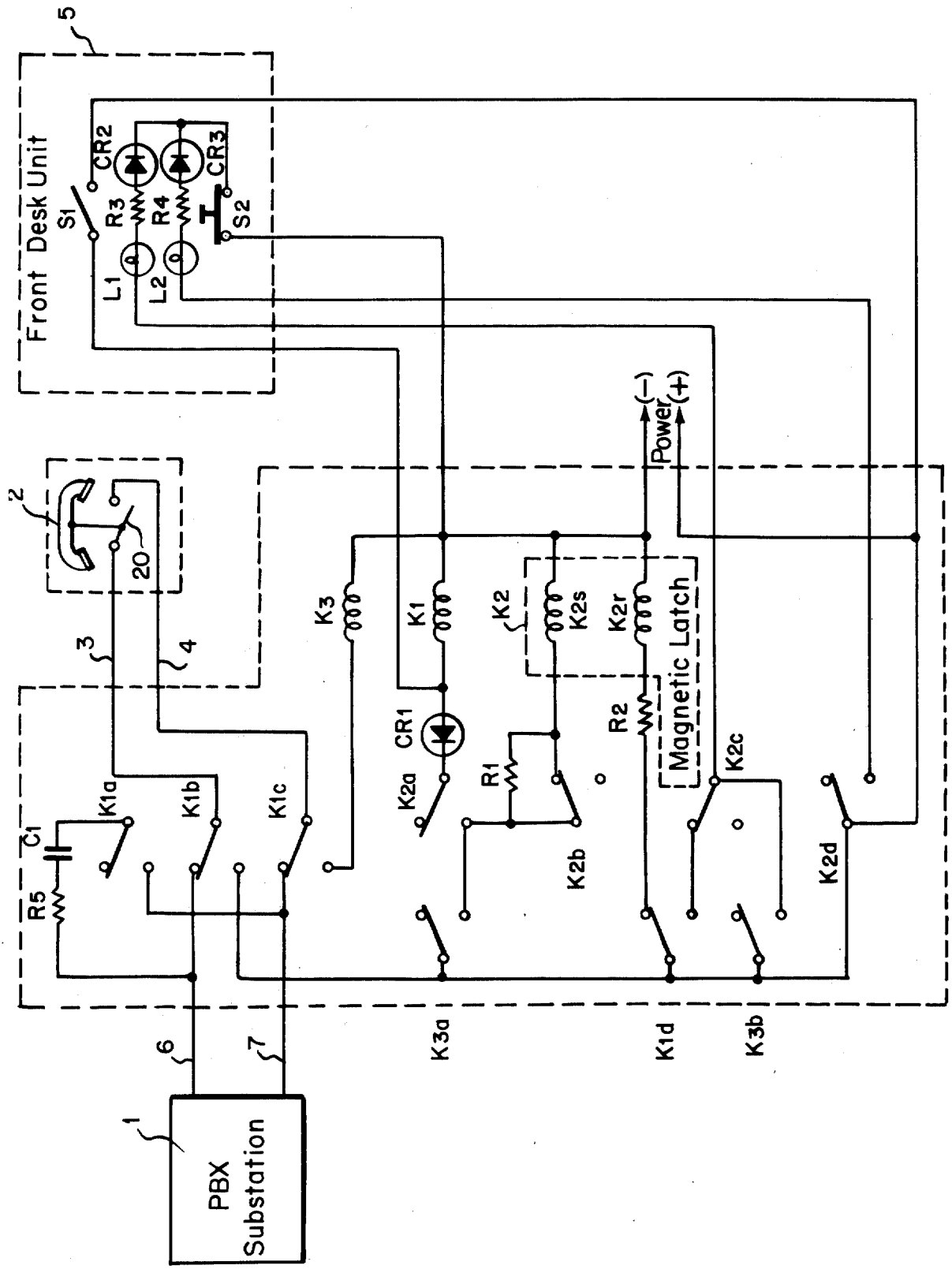

TELEPHONE OPERATED SIGNALLING SYSTEM

DESCRIPTION OF THE PRIOR ART

Telephone systems are known which include indicating means located at a check-in or check-out counter by which the status of a room in a hotel or motel may be indicated. Such systems include circuitry by which a telephone may be disconnected from a telephone substation and connected to a room status system upon actuation of a control switch by a room clerk and where the indicating means will indicate a room in need of cleaning condition. Further, circuitry is included such that a maid upon entering a room may utilize the room telephone to transmit a signal to the indicating means to indicate that she is in the room and cleaning it. Upon completion of cleaning, the maid utilizes the telephone to transmit a further signal to the indicating means to indicate that the room has been cleaned and is ready for rental. At such time as the room is rented, the clerk may move the control switch to disconnect the room telephone from the status system and reconnect it to a telephone substation. Examples of such systems are disclosed in U.S. Pat. Nos. 3,614,325 and 3,854,009. Telephone systems as disclosed in those patents have a limitation in that they are not compatible for use with certain types of central office equipment, such as the Centrex type which include a test circuit scanning means for testing proper connection of individual telephone lines to the substation. This is because when the telephones are disconnected from the central office equipment, a "failed line" condition will be transmitted back to the central office station. It is therefore an object of my invention to provide circuitry by which a telephone operated signalling system may be disconnected from central office equipment without triggering any failed line signal.

A further difficulty of some of the telephone signalling systems of the prior art has been that any status signals indicating status of a room may be "lost" in the event of any brief power interruption. For example, in the system as shown in U.S. Pat. No. 3,614,325 in the event of a power interruption, exceeding a few hundred milliseconds, all indicating means indicating that a room has been cleaned and is ready for occupancy would be lost. If this event occurs, it then becomes necessary to physically recheck each room to determine its status which, in the event of a large hotel or motel, can result in an extraordinary amount of time and effort. It is therefore a further object of my invention to provide a holding means which will hold the state of an indicating means regardless of any power interruption such that when power is restored, the indicating means will be in the same state as before the power interruption.

Prior art telephone systems as exemplified in the aforementioned patents continually transmit status information until such time that the rooms have been rented and telephones of the individual rooms reconnected to the central station. During periods of low room occupancy, this can result in prolonged energization of the individual bulbs used to transmit status information resulting in excessive use of electrical power and shortened bulb life. It is therefore a further object of my invention to provide means for disconnecting individual status indicating means from the power means utilized to energize the indication means during prolonged periods when the telephone is connected to the signalling system.

GENERAL DESCRIPTION OF THE INVENTION

Broadly a telephone operated signalling system constructed according to my invention comprises a desk unit having an actuation switch by which a telephone may be disconnected from a telephone substation and connected to a signalling system. The telephone is of conventional construction and has a manually operated switch associated therewith in the form of a switch moveable to open and closed positions when the telephone is lifted and replaced on its receiver or in the form of a rotary dial operated stepping switch. The desk unit has indicating means to indicate status of a room. Circuit means are provided including means responsive to actuation of the actuation switch to disconnect the telephone from the substation and connect it to the signalling system and to indicate a first condition. A further circuit means is provided to effect a change in the indicating means when the manually operated switch is moved, as for example by lifting a telephone from its receiver or dialing a particular number. Additional circuit means is included which is responsive to movement of the manually operated switch to an open position or dialing a further number to indicate a third condition. The system includes a holding means for maintaining the indicating means in any particular condition in the event of a power interruption in the system.

A further embodiment of the invention includes having a circuit adapted to be connected to the substation when the telephone is disconnected therefrom and connected to the signalling system whereby the circuit will preclude triggering of any malfunction signal imparted by an scanning test current applied to the substation.

A still further embodiment of the invention includes the addition of a switch means between indicator bulbs contained in the signalling system and a power source in order that the bulbs may be disconnected from the signalling system during long periods that the telephone of an individual room is connected to the signalling system.

BRIEF DESCRIPTION OF THE DRAWING

The drawing is a schematic representation of the circuitry involved in a signalling system constructed according to the invention.

DETAILED DESCRIPTION OF THE PREFERRED EMBODIMENT

Referring to the drawing there is illustrated a telephone substation 1 adapted to be connected to a telephone 2 contained within an individual room by means of telephone wires 3 and 4. The system includes a front desk unit 5 containing for each room an actuation switch S1, a first or red indicator lamp L1 and a second or green indicator lamp L2 by which the status of each individual room of a hotel or motel may be ascertained. The desk unit also includes for each room a resistance element R3 and diode CR2 contained within the red lamp circuit as well as a resistance element R4 and a diode CR3 contained within the green lamp circuit. A disconnect switch S2 is included in order to disconnect the circuit containing the bulbs L1 and L2 from a power means energizing the circuit as explained more fully hereafter.

The telephone wires 3 and 4 are disconnected from the substation 1 and connected to the signalling system by means of a relay operated switch having contacts Klb and Klc when a relay coil K1 is energized. The various relay switches illustrated in the drawing are shown in the deenergized position of their associated relay coils. At the same time that the telephone wires are disconnected from the substation, a circuit comprising a resistance element R5 and capacitor C1 is connected across the leads 6 and 7 extending to the substation by way of contact Kla. The combination of the resistance element R5 and the capacitor C1 allows current flow through the leads 6 and 7 during the time it takes to charge the capacitor. In the event that a test scanning current is applied to the leads 6 and 7 to test for proper connection of a telephone with the substation, as for example with substations of the Centrex type, then the scanning current flow will indicate that the telephone is properly connected and prevent the triggering of any malfunction signal.

The signalling system preferably includes a magnetic latching relay K2 having a set coil K2s and a reset coil K2r plus a resistance element R2 whereby resetting of relay K2 once it has been set or operated is prevented, except when the K2r coil is energized. As explained more fully hereafter this arrangment prevents any movement of switches operated by the K2 relay in the event of any power interruption.

Operation of the system is as follows. When a guest checks out, the front desk clerk closes switch S1 which in turn energizes relay K1 through the plus and minus sides of the power connection. Energization of relay K1 moves the switches at the Klb and Klc contacts to disconnect the telephone wires 3 and 4 from the leads 6 and 7. At the same time the circuit comprising the resistance elements R5 and compacitor C1 is connected to the leads 6 and 7 through the contact Kla such that in the event any test scanning current is applied to the leads to test for connection of the telephone to the substation, an indication will be given during the time that it takes to charge the capacitor C1 that the telephone wires 3 and 4 are connected to the substation thus preventing the triggering of any malfunction signal.

At the same time relay K1 is energized, a circuit will be completed to energize the red lamp L1 from the negative power connection via the diode CR2, resistance element R3, contact K2c, contact K1d to the positive power connection, the red light indicating a first condition that the room is in need of cleaning.

When the maid enters the room she removes the telephone handset closing the switch 20 within the cradle. This will then energize relay K3 by way of the negative power connection through contact K1c, switch 20, contact K1b to the positive power connection. Energization of relay K3 in turn results in the continued energization of the red lamp L1 through the negative power connection, contact K3b, to the positive power connection. At the same time relay K2 will be energized from the negative power connection, through coil K2s, resistance element R1, contact K3a, back to the positive power connection. Setting of relay K2 in turn will complete a circuit between the positive power connection, contact K2d, lamp L2, resistance element R4, diode CR3, switch S2 to the negative power connection to energize the green lamp. Energization of both the red lamp L1 and the green lamp L2 indicates a second condition that the maid is in the room and cleaning the same.

Upon finishing cleaning, the maid replaces the telephone 2 on its cradle thus opening switch 20. This in turn breaks the circuit energizing relay K3 causing the red lamp L1 to be disconnected from the positive side of the power input through the now open contact K3b. The green light will remain on indicating a third condition that the room has been cleaned and is ready for rental.

In prior art systems such as disclosed in U.S. Pat. No. 3,614,325, the room-cleaned condition was subject to being lost upon any power interruption exceeding a few milliseconds since deenergization of the K2 relay would open the K2d contact breaking the green lamp circuit and the K2 relay holding circuit including resistance element R1 and contact K2a. Restoration of power would not set or operate the K2 relay since the holding circuit for the K2 relay including contact K2a would remain open. This condition would then require physically checking all of the rooms in the hotel or motel to ascertain whether they were cleaned and available for rental. In the arrangement shown, a magnetic latching relay K2 is provided which holds its set or operated condition regardless of any power interruption. In order for the K2 relay to move, the reset coil K2r must be energized. The result is that when power is returned to the system, the green lamps remain energized giving a correct room status condition.

When a room is rented, the clerk opens switch S1 which then deenergizes relay K1 allowing the telephone wires 3 and 4 to be reconnected to the substation. At the same time, contact K1d is connected to the magnetic latching reset coil K2r which then allows relay K2 to move to the reset position. This in turn results in contact K2d opening to break the green lamp circuit.

In the event that rooms may remain unrented for a long period of time, switch S2 is opened breaking the circuit containing the red and green lamps. This results in prolonged lamp life and at the same time reducing power requirements. The status of the room may be rechecked at any time by closing switch S2.

While the drawing illustrates the use of a non-dial telephone, it is apparent that a telephone having a manually rotatable dial operating a stepping switch could be substituted for the telephone and switch 20 shown.

I claim:
1. A telephone operated signalling system having:
   A. A telephone substation,
   B. A telephone having a manually operated switch connected to said substation by telephone wires,
   C. A desk unit having an actuation switch and indicating means for indicating status of a room,
   D. Power means adapted to energize said indicating means, and
   E. Circuit means including:
      i. First means responsive to actuation of said actuation switch for disconnecting said telephone wires from said substation and connecting said telephone wires to said indicating means, and
      ii. Second means responsive to movement of said manually operated switch for changing energization of said indicating means;
   the improvement comprising having indicator switch means positioned between said power means and said indicating means for disconnecting said indicating means from said power means during long periods of time that said telephone wires are connected to said indicating means.

2. A telephone operated signalling system having:
A. A telephone substation,
B. A telephone having a manually operated switch connected to said substation by telephone wires,
C. A desk unit having an actuation switch and indicating means for indicating status of a room,
D. Power means adapted to energize said indicating means, and
E. Circuit means including:
  i. Means responsive to actuation of said actuation switch for disconnecting said telephone wires from said substation and connecting said wires to said indicating means to indicate a first condition,
  ii. A means responsive to movement of said manually operated switch for changing energization of said indicating means to indicate a second condition, and
  iii. Means responsive to further movement of said manually operated switch for changing energization of said indicating means to indicate a third position;

the improvement comprising having a holding means for maintaining said means responsive to further movement of said manually operated switch in its responsive state regardless of energization of said power means.

3. A telephone operated signalling system according to claim 2 wherein said holding means comprises a magnetic latching relay.

* * * * *